United States Patent
Rosseel et al.

(10) Patent No.: US 9,775,298 B2
(45) Date of Patent: Oct. 3, 2017

(54) ROTOR FEEDER UNIT FOR AGRICULTURAL MACHINES

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/299,083

(22) Filed: Oct. 20, 2016

(65) Prior Publication Data

US 2017/0105355 A1   Apr. 20, 2017

(30) Foreign Application Priority Data

Oct. 20, 2015 (BE) .............................. BE2015/5680

(51) Int. Cl.
*A01F 15/04* (2006.01)
*A01F 15/08* (2006.01)
(Continued)

(52) U.S. Cl.
CPC ............ *A01F 15/10* (2013.01); *A01D 89/002* (2013.01); *A01F 15/042* (2013.01);
(Continued)

(58) Field of Classification Search
CPC .... A01F 15/10; A01F 15/0841; A01F 15/042; A01F 15/101; A01F 2015/102; A01D 89/002
(Continued)

(56) References Cited

U.S. PATENT DOCUMENTS 2,674,839 A * 4/1954 Russell ................. A01F 15/101
　　　　　　　　　　　　　　　　　　　　　100/189
4,751,810 A * 6/1988 Naaktgeboren ........ A01D 90/02
　　　　　　　　　　　　　　　　　　　　　100/142
(Continued)

FOREIGN PATENT DOCUMENTS

DE           3239932 A1    5/1984
DE    102008014998 A1    9/2009
(Continued)

OTHER PUBLICATIONS

EP16194887, Extended European Search Report, mailed Feb. 21, 2017, 6 pages.

Primary Examiner — Jimmy T Nguyen
(74) Attorney, Agent, or Firm — Peter K. Zacharias; Patrick M. Sheldrake

(57) ABSTRACT

A rotor feeder unit for an agricultural machine, such as an agricultural baler. The rotor feeder unit includes a rotor feeder, and a drive for driving the rotor feeder. The drive of the rotor feeder unit include an input that is configured to be coupled to a power source, an output coupled to the rotor feeder for rotating the rotor feeder about its axis of rotation, and a variable ratio transmission coupling the input and the output. The variable ratio transmission includes a variable-diameter input pulley, a variable-diameter output pulley, and a belt arranged between the input pulley and the output pulley.

12 Claims, 6 Drawing Sheets

(51) Int. Cl.
*A01F 15/10* (2006.01)
*A01D 89/00* (2006.01)

(52) U.S. Cl.
CPC ........ *A01F 15/0841* (2013.01); *A01F 15/101* (2013.01); *A01F 2015/102* (2013.01)

(58) Field of Classification Search
USPC .......................... 100/7, 188 R, 189; 56/341
See application file for complete search history.

(56) References Cited

U.S. PATENT DOCUMENTS

| | | | | |
|---|---|---|---|---|
| 4,928,462 A | * | 5/1990 | Lippens | A01F 15/101 100/142 |
| 4,962,632 A | * | 10/1990 | Schoonheere | A01F 15/101 100/142 |
| 5,090,307 A | * | 2/1992 | Lippens | A01B 61/025 100/142 |
| 7,252,587 B2 | | 8/2007 | Viaud | |

FOREIGN PATENT DOCUMENTS

| | | |
|---|---|---|
| DE | 102010010863 A1 | 9/2011 |
| EP | 1574124 A1 | 9/2005 |

* cited by examiner

ROTOR FEEDER UNIT FOR AGRICULTURAL MACHINES

CROSS REFERENCE TO RELATED APPLICATION

This application claims priority to Belgium Application No. 2015/5680 filed Oct. 20, 2015, the contents of which are incorporated herein by reference.

FIELD OF THE INVENTION

The present invention relates to a rotor feeder unit for agricultural machines, and more specifically to a rotor feeder unit for an agricultural baler.

BACKGROUND OF THE INVENTION

Known agricultural balers are provided with a rotor feeder unit that feeds crop material, e.g. supplied by a pick-up device, into a bale forming cavity in case of a so called round baler or into a feeder duct, also known as pre-compression chamber, in case of a so called rectangular baler. Another agricultural machine that includes such a rotor feeder unit is a loading wagon. The rotor feeder unit of a loading wagon feeds the crop material, e.g. supplied by a pick-up device, into a storage hopper of the loading wagon.

Known rotor feeder units for agricultural machines in general comprise a rotor feeder carrying a set of tines, said rotor feeder being rotatable about an axis of rotation; a rotor feeder unit bottom wall distant from the rotor feeder forming a lower boundary of a conveying channel through the rotor feeder unit; and scrapers placed in conveying direction behind the rotor feeder, the scrapers extending in between the tines and having a leading face cooperating with the tines. Said known rotor feeder units are further provided with a rotor feeder drive for causing the rotor feeder to rotate about its axis of rotation, wherein said rotor feeder drive is suitable for coupling to a power source.

In operation, the rotor feeder is rotated about its axis of rotation by means of the rotor feeder drive, such that the tines carried by the rotor feeder pass through the conveying channel in a conveying direction. The tines carried by the rotor feeder take supplied crop material and force the crop material through the conveying channel in the conveying direction. The scrapers remove the cut crop material from the tines and guide it further in conveying direction through the conveying channel.

Rotor feeder units of the above kind are known that are additionally provided with cutting blades protruding from the rotor feeder unit bottom wall through the conveying channel besides moving paths of the cutting blades. In such rotor feeder units, also referred to as rotor cutter units, the crop material supplied thereto is cut while being conveyed through the conveying channel. In such conveyor units, in operation, the rotor feeder is rotated about its axis of rotation by means of the rotor feeder drive, such that the tines carried by the rotor feeder pass by the cutting blades in a conveying direction. The tines carried by the rotor feeder take supplied crop material and force the crop material over the cutting blades. The cutting blades cut the crop material into smaller pieces. During and/or after the cutting process, the scrapers remove the cut crop material from the tines and guide it further in conveying direction through the conveying channel.

In general, agricultural machines are driven by a single power source, for instance the engine of a tractor that carries, pulls or pushes the agricultural machine, or in case of a self-propelled agricultural machine a main engine thereof. In such agricultural machines said single power source provides power for all driven implements of the machine. An example is an agricultural baler of the traditional rectangular type, i.e. balers which produce bales of crop material which are rectangular in side view. The driven implements of such balers of the traditional rectangular type in general include: a rotor feeder unit for feeding crop material to a feeder duct; feeder means operable in the feeder duct to accumulate charges of crop material in the feeder duct and to transfer accumulated charges of crop material into a bale chamber; and a plunger operable in the bale chamber to compress successive charges of crop material received from the feeder duct to form a bale. In such balers of the traditional rectangular type in general the rotor feeder unit, the feeder means, and the plunger are all driven by the same single power source.

SUMMARY OF THE INVENTION

The present invention has for its object to provide an improved rotor feeder unit for an agricultural machine, in particular for an agricultural baler of the traditional rectangular type.

Thereto the rotor feeder unit according to the invention comprises a rotor feeder and a drive for driving said rotor feeder, wherein said drive comprises an input that is configured to be coupled to a power source in order to be powered by said power source, an output coupled to the rotor feeder for rotating the rotor feeder about its axis of rotation, and a variable ratio transmission coupling said input and said output.

The variable ratio transmission of the rotor feeder unit according to the invention allows to adapt the torque delivered to the rotor feeder at the output of the variable ratio transmission, and/or the rotational speed of the rotor feeder to specific operational circumstances. In order to operate the rotor feeder a certain torque is required to convey the crop material through the rotor feeder unit and optionally to cut the crop material while conveying the crop material through the rotor feeder unit. The required torque depends on properties of the crop material being conveyed and optionally cut. The variable ratio transmission of the rotor feeder unit according to the invention for instance allows for changing the torque delivered to the rotor feeder in case the properties of the crop material to be conveyed and optionally cut change. Furthermore, the rotational speed of the rotor feeder is a determinant for the throughput of the rotor feeder unit and for the velocity of the cut crop material downstream of the rotor feeder. If the throughput is to low, a blockage may occur upstream of the rotor feeder unit. Furthermore, a certain throughput of the rotor feeder unit may result in the operation of a downstream implement being less effective. Still further, if the velocity of the crop material downstream of the rotor feeder is too low, a blockage of the rotor feeder unit or the part of the agricultural machine connected to the outlet of the rotor feeder unit may occur. The throughput of the rotor feeder unit and the velocity of the crop material downstream of the rotor feeder that are required in order to prevent blockage and allow effective operation of possible downstream implements of the agricultural machine depend on the properties of the crop material being conveyed and optionally cut. The variable ratio transmission of the rotor feeder unit according to the invention for instance allows for changing the speed of the rotor feeder, and thus the throughput of the rotor feeder unit and the velocity of the crop material downstream of the rotor feeder, in case the properties of the crop material to be conveyed an optionally cut change. In particular in case a single power source powers other implements in addition to the rotor feeder unit via a shared mechanical main drive, the provision of a variable ratio transmission in the rotor feeder unit according to the invention allows for changing the rotational speed of the rotor feeder without changing the operational speed of the other implements. This is advantageous in that changing the operational speed of the other implements may cause the operation of the other implements to be less effective.

It is noted that the change of torque delivered to the rotor feeder and the change of rotational speed of the rotor feeder can only be achieved in case the power source is able to handle the associated change in torque to be delivered to the input of the variable ratio transmission by the power source. The amount of torque that can be delivered to the input of the variable ratio transmission by the power source powering the rotor feeder unit is limited and, as described herein above, generally has to be shared with other driven implements of the agricultural machine. In case a single power source that is shared by additional implements in addition to the rotor feeder unit according to the invention, cannot handle said associated change in torque to be delivered to the input of the variable ratio transmission, the torque delivered to the additional implements is reduced, which, if necessary for effective operation of the agricultural machine, may be compensated by causing the other implements to have a reduced torque demand. The latter may be implemented by providing the other implements with a variable ratio transmission.

As described herein above, the provision of a variable ratio transmission in the rotor feeder unit allows for adapting the torque delivered to the rotor feeder at the output of the variable ratio transmission to specific operational circumstances. The other way around, the provision of a variable ratio transmission in the rotor feeder unit allows for adapting the torque demand at the input of the variable ratio transmission to specific operational circumstances. In case for instance the power source cannot deliver the torque demanded by the rotor feeder unit at the input of the variable ratio transmission, the variable ratio transmission allows to reduce the torque demand. In case a single power source that is shared by additional implements in addition to the rotor feeder unit according to the invention, cannot handle the total amount of torque demanded by the rotor feeder unit and the additional implements as a result of an increased torque demand for one of the additional implements, the variable ratio transmission allows to reduce the torque demanded by the rotor feeder unit, such that additional torque is available for delivery to the additional implements.

The rotor feeder unit according to the invention is in particular advantageous when implemented in an agricultural baler of the traditional rectangular type, i.e. balers which produce bales of crop material which are rectangular in side view, including:

a rotor feeder unit for cutting the picked up crop material and conveying the cut crop material to a feeder duct, which rotor feeder unit is provided with a rotor feeder;

feeder means operable in the feeder duct to accumulate charges of crop material and to transfer accumulated charges of crop material into a bale chamber; and a plunger operable in the bale chamber to compress successive charges of crop material received from the feeder duct to form a bale;

wherein the rotor feeder unit, the feeder means, and the plunger are all driven by the same single power source.

In the known balers of the traditional rectangular type the rotor feeder unit, the feeder means and the plunger are coupled to a single power source by means of a main drive, wherein the rotor feeder unit is provided with a fixed ratio transmission coupling the main drive to the rotor feeder.

By providing the known balers of the traditional rectangular type with a rotor feeder unit according to the invention that is provided with a variable ratio transmission instead of a fixed ratio transmission, the torque delivered to the rotor feeder and the rotational speed of the rotor feeder can be changed as described herein above; the latter in particular without changing the torque delivered to and/or operational speed of the additional implements formed by the feeder means and the plunger. Furthermore, the torque demanded by the rotor feeder at the input of the variable ratio transmission may be reduced as a compensation to allow change of torque delivered to the additional implements formed by the feeder means and the plunger in case as a result of that change the total torque demand exceeds the torque that the power source can provide. In an agricultural baler of the traditional rectangular type the torque demand of the plunger is relatively high during the startup of the operation of the baler relative to the operation after startup. With the variable ratio transmission of the rotor feeder unit according to the invention, it is advantageously possible to reduce the torque demand of the rotor feeder unit during startup of the operation of the plunger. This allows for the use of a less powerful power source to power the baler.

In a preferred embodiment of the rotor feeder unit according to the invention, the variable ratio transmission is a continuously variable ratio transmission. A continuously variable ratio transmission allows for stepless change of the transmission ratio provided by the variable ratio transmission under load.

In an advantageous embodiment thereof, the variable ratio transmission is a mechanical continuously variable ratio transmission. Mechanical variable ratio transmissions are particularly suitable for application in an agricultural machine for being simple in construction and being reliable. Alternatively, the variable ratio transmission is a hydraulic continuously variable ratio transmission, electric continuously variable ratio transmission, a hydro-mechanical continuously variable ratio transmission, or a electro-mechanical continuously variable ratio transmission.

Preferably, the variable ratio transmission is a mechanical continuously variable ratio transmission of the belt type, in particular comprising a variable-diameter input pulley, variable-diameter output pulley, and a belt arranged between said input pulley and said output pulley. A mechanical continuously variable ratio transmission of the belt type requires a relative small amount of installation space. In particular a mechanical continuously variable ratio transmission of the belt type requires about the same installation space as a traditional chain drive that is generally used in agricultural machines as a fixed ratio transmission for rotor feeder units. Furthermore, a mechanical continuously variable ratio transmission of the belt-type can relatively easy be mounted instead of a traditional fixed ratio chain drive without extensive redesign of the agricultural machine.

As an alternative to continuously variable ratio transmission, the variable ratio transmission can advantageously be a stepped gear transmission. Preferably, such a stepped gear transmission is configured for shifting between gear ratios under load, in particular by employing power shift clutches.

Such stepped gear transmissions only provide discrete ratio steps, while continuously variable ratio transmissions provide a continuously variable ratio. It is noted, that a continuously variable ratio transmission may be controlled such that it provides stepped gear ratios.

It would also be possible that the drive of the rotor feeder unit comprises a combination of a continuously variable ration transmission and a stepped gear transmission, either integrated in a single transmission or as two separate transmissions that are drivingly coupled.

In an advantageous embodiment of the rotor feeder unit according to the invention, the drive of the rotor feeder unit comprises a reversing mechanism for selectively reversing the direction of rotation of the rotor feeder. Such a reverse mechanism allows for removing a plug of crop material that is stuck in the rotor feeder unit at the rotor feeder or upstream thereof. The variable ratio transmission of the drive of the rotor feeder unit may include a reverse mechanism that is configured for selectively reversing the direction of rotation of the output thereof. Alternatively a separate transmission that is drivingly coupled to the input or output of the variable ratio transmission may be configured for selectively reversing the direction of rotation of said input or output.

In an advantageous embodiment of the rotor feeder unit according to the invention the variable ratio transmission is variable by selective operation. This allows for changing the transmission ratio of the variable ratio transmission at will, i.e. without a condition that requires a change being necessarily present and without a the change necessarily being the same each time a given condition occurs. Another suitable term for selective operation would be active operation. In a preferred embodiment of the rotor feeder unit according to the invention having a variable ratio transmission that is variable by selective operation, the variable ratio transmission comprises an actuator for selective operation thereof; and the rotor feeder unit comprises a controller connected to the actuator for controlling said actuator. As an alternative to the variable ratio transmission being variable by selective operation, the variable ratio transmission is variable by passive operation. Passive operation is operation caused by a certain condition and thus requires said condition to occur. A variable ratio transmission that is variable by passive operation is for instance a mechanical continuously variable ratio transmission of the belt-type including a speed variator. Such a mechanical continuously variable ratio transmission of the belt-type including a speed variator could for instance be applied in a rotor feeder unit according to the invention in case a constant rotational speed of the rotor feeder is required.

In an advantageous embodiment of the rotor feeder unit according to the invention including an actuator for selective operation of the variable ratio transmission and a controller for controlling said actuator, the rotor feeder unit comprises at least one sensor connected to the controller and configured for measuring at least one operational parameter of the rotor feeder unit, and the controller is configured for causing said actuator to selectively operate the variable ratio transmission based on said at least one operation parameter measured by means of said sensor. Preferably, said at least one operational parameter of the rotor feeder unit is at least one of an operational parameter indicative of the torque at the output of the variable ratio transmission, an operational parameter indicative of the torque at the input of the variable ratio transmission, an operational parameter indicative of the rotational speed of the rotor feeder, an operational parameter indicative of the operational speed at the input of the variable transmission, and an operational parameter indicative of the operational speed at the output of the variable transmission.

In a further advantageous embodiment of the rotor feeder unit according to the invention, the rotor feeder unit further comprises a rotor feeder unit bottom wall distant from the rotor feeder forming a lower boundary of a conveying channel through the rotor feeder unit; and cutting blades that are configured to protrude from the rotor feeder unit bottom wall into the conveying channel besides moving paths of the tines. As described herein above, such a rotor feeder unit is also referred to as a rotor cutter unit. In a preferred embodiment the cutting blades are selectively movable between a cutting position in which the cutting blades protrude into the conveying channel and a retracted position in which the cutting blades do not protrude into the conveying channel. In particular in the latter preferred embodiment, the required torque to rotate the rotor feeder and/or the required rotational speed of the rotor feeder with the cutting blades in their cutting position may be different from the required torque and/or rotational speed with the cutting blades in their retracted position. The variable ration transmission of the rotor feeder unit according to the invention allows for adjusting the torque delivered to the rotor feeder and/or the rotational speed of the rotor feeder to the required torque and/or rotation speed for the selected position of the cutting blades.

In a further advantageous embodiment of the rotor feeder unit according to the invention, the rotor feeder unit further comprises:

a rotor feeder unit bottom wall distant from the rotor feeder forming a lower boundary of a conveying channel through the rotor feeder unit;

scrapers placed in conveying direction behind the rotor feeder, the scrapers extending in between the tines and having a leading face cooperating with the tines;

wherein the rotor feeder unit comprises a scraper position adjusting arrangement adapted for displacing the leading face of the scrapers relative to the rotor feeder unit bottom wall.

Changing the rotational speed of the rotor feeder by changing the transmission ratio of the variable ration transmission of the rotor feeder unit according to the invention, changes the velocity of the crop material downstream of the rotor feeder. In case the reason for changing the rotational speed of the rotor feeder is changing the throughput, the change of the rotational speed of the rotor feeder may result in an undesired change of the velocity of the crop material downstream of the rotor feeder. The scraper position adjusting arrangement adapted for angular displacement of the leading face of the scrapers relative to the rotor feeder unit bottom wall, allows for changing the velocity of the cut crop material downstream of the rotor feeder in order to compensate for such undesired change of said velocity. The leading face of the scrapers cooperates with the rotor feeder to remove the cut crop material from the rotor feeder and guide it further in conveying direction through the conveying channel. The leading face of the scrapers thereby form an upper boundary of the conveying channel through the rotor feeder unit, while the rotor feeder unit bottom wall forms a lower boundary of a conveying channel. In order for the scrapers to effectively guide the cut crop material further in conveying direction, the shape of the end of the conveying channel formed between the leading face of the scrapers and the rotor feeder unit bottom wall, in particular in a plane perpendicular to the axis of rotating of the rotor feeder, is that of a reverse funnel. The scraper position adjusting arrangement according to the invention allows for displacing the leading face of the scrapers relative to the rotor feeder unit bottom wall, thereby adjusting the reverse funnel shape of the end of the conveying channel formed between the leading face of the scrapers and the rotor feeder unit bottom wall. By displacement of the leading face of the scrapers relative to the rotor feeder unit bottom wall, in particular in a plane perpendicular to the axis of rotating of the rotor feeder, the reverse funnel shape of the end of the conveying channel can be widened or narrowed. Widening or narrowing the reverse funnel shape of the end of the conveying channel changes the velocity of the flow of cut crop material downstream of the rotor feeder. Preferably, the scraper position adjusting arrangement is adapted for rotating the scrapers about the axis of rotation of the rotor feeder for angularly displacing the leading face of the scrapers relative to the rotor feeder unit bottom wall. This preferred feature allows for angularly displacing the leading face of the scrapers relative to the rotor feeder unit bottom wall without adjusting the angle of the leading face of the scrapers relative to the leading face of the tines of the rotor feeder. This has the advantage that angularly displacing the leading face of the scrapers relative to the rotor feeder unit bottom wall does not affect the angle between the leading face of the tines and the leading face of scrapers, thereby leaving the cooperative action of the tines of the rotor feeder and the scrapers unaffected. Alternatively, the scraper position adjusting arrangement is adapted for displacing the leading face of the scrapers relative to the rotor feeder unit bottom wall such that the angle of the leading face of the scrapers relative to the leading face of the tines of the rotor feeder is adjusted.

In an advantageous embodiment of the rotor feeder unit according to the invention that is provided with a scraper position adjusting arrangement, said scraper position adjusting arrangement comprises an actuator acting on the scrapers and configured for angularly displacing the leading face of the scrapers relative to the rotor feeder unit bottom wall; and the controller is connected to the actuator of the scraper position adjusting arrangement for controlling of the actuator of the scraper position adjusting arrangement in addition to controlling of the actuator of the variable ratio transmission.

This allows for the controller to control both the variable ratio transmission and the scraper position adjusting arrangement thereby allowing for coordination of the operation of the variable ratio transmission and the operation of the scraper position adjusting arrangement.

In a preferred embodiment the rotor feeder unit comprises at least one sensor connected to the controller and configured for measuring at least one of an operational parameter that is indicative of the rotational speed of the rotor feeder, an operational parameter that is indicative of the throughput of the rotor feeder, and an operational parameter that is indicative of the velocity of the crop material downstream of the rotor feeder, wherein the controller is configured for causing said actuator of the scraper position adjusting arrangement to angularly displace the leading face of the scrapers relative to the rotor feeder unit bottom wall based on said at least one operation parameter measured by means of said at least one sensor.

The present invention further relates to an agricultural machine, comprising a rotor feeder unit according to the invention as described herein above, at least one additional operational implement, and a main drive for driving the rotor feeder unit and said at least one additional operational implement, wherein the main drive is provided with an output for driving the rotor feeder unit and the input of the drive of the rotor feeder unit is coupled to the output of the main drive of the baler.

By providing such an agricultural machine with a rotor feeder unit according to the invention that is provided with a variable ratio transmission, the torque delivered to the rotor feeder and the rotational speed of the rotor feeder can be changed as described herein above; the latter in particular without changing the torque delivered to and operational speed of the additional implement(s), despite the rotor feeder unit and the additional implement(s) being drivingly coupled to a shared main drive. Alternatively, the variable ratio transmission of the rotor feeder unit allows for changing the torque delivered to the rotor feeder and the rotational speed of the rotor feeder as a compensation to allow a change of torque delivered to the additional implement(s) in case said change of torque delivered to the additional implement(s) would result in the total torque demand exceeding the torque that the power source driving the main drive can provide.

In a preferred embodiment, the agricultural machine according to the invention comprises at least one sensor connected to the controller of the rotor feeder unit and configured for measuring at least one of an operational parameter that is indicative of the torque delivered to the main drive, an operational parameter that is indicative of the torque delivered to said at least one additional operational implement, and an operational parameter that is indicative of the torque delivered to the rotor feeder unit, wherein the controller is configured for causing said actuator of variable ratio transmission of the rotor feeder unit to selectively operate the variable ratio transmission based on said at least one operational parameter measured by means of said at least one sensor.

The present invention further relates to an agricultural baler comprising:

a bale chamber having an inlet opening formed therein; and a feeder duct communicating with the bale chamber through the inlet opening for charges of crop material to be transferred from the feeder duct into the bale chamber;

a plunger reciprocable within the bale chamber to compress successive charges of crop material received from the feeder duct to form a bale;

feeder means operable within the feeder duct to accumulate a charge of crop material therein and then stuff that accumulated charge into the bale chamber; and a rotor feeder unit according to the invention as described herein above and configured for cutting crop material and for conveying cut crop material to the feeder duct;

a main drive for driving the plunger, the feeder means, and the rotor feeder unit, wherein the main drive is provided with an output for driving the rotor feeder unit and the input of the drive of the rotor feeder unit is coupled to the output of the main drive of the baler.

BRIEF DESCRIPTION OF THE DRAWINGS

The accompanying drawings are used to illustrate a non-limitative preferred exemplary embodiment of the present invention. The above stated and other advantages, features and objectives of the invention will become more apparent, and the invention better understood, from the following detailed description when read in combination with the accompanying drawings, in which.

DETAILED DESCRIPTION OF THE INVENTION

Figure 1:
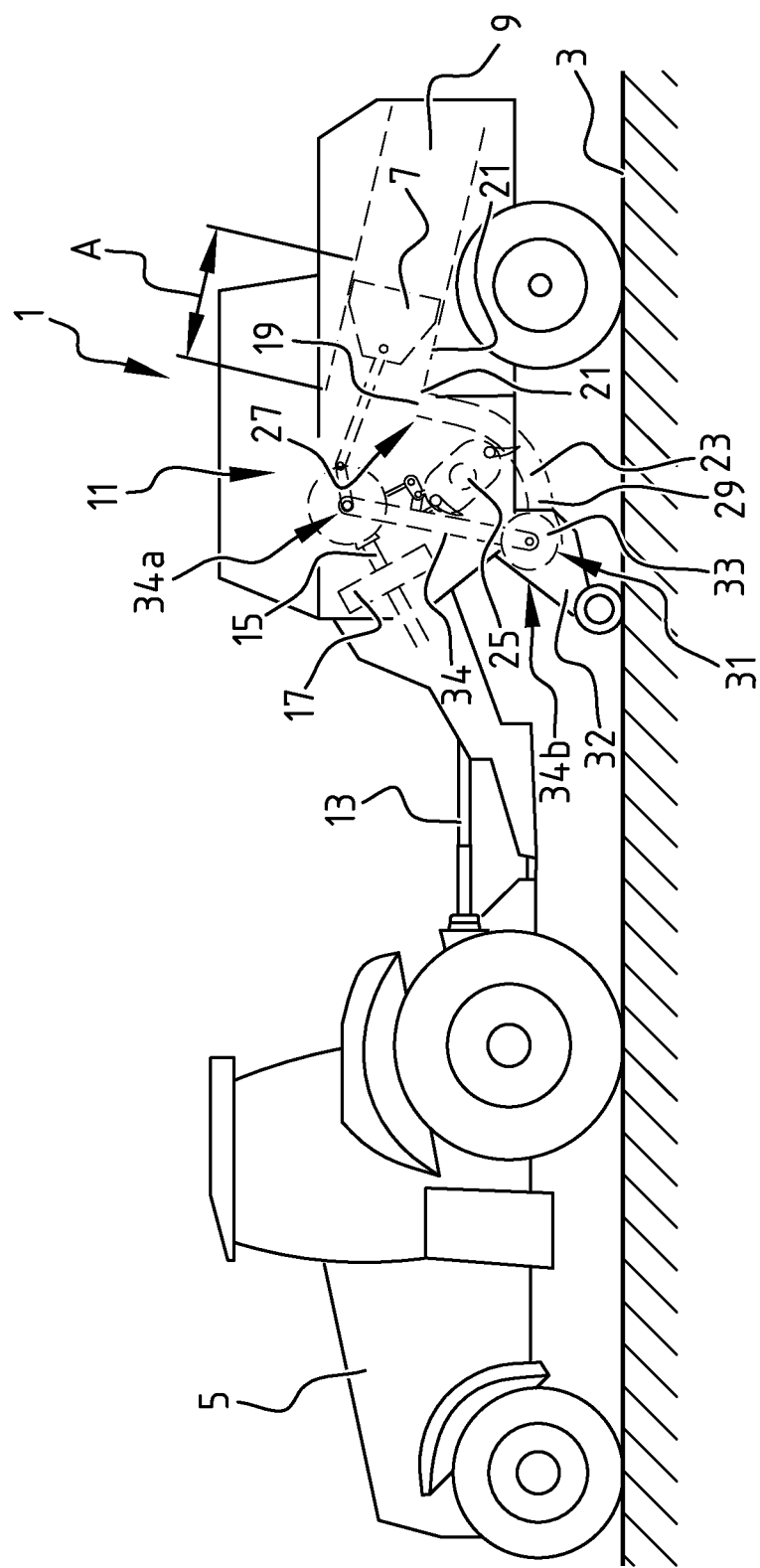
FIG. 1 shows a schematic side view of a rectangular baler, drawn and driven by a tractor, said baler being provided a rotor feeder unit arranged for cutting crop and conveying cut crop material to the feeder duct of the baler.

FIG. 1 shows a rectangular agricultural baler 1. Baler 1 can be moved forward over ground surface 3 by means of a tractor 5. Baler 1 is provided with a plunger 7 that during operation is moved reciprocally along a linear path A in bale chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a rotor feeder unit 31. The rotor feeder unit 31 is arranged for cutting crop material supplied by a pick-up device 32 and to convey the cut crop material into the feeder duct 23. The rotor feeder unit 31 is provided with a rotor feeder 33 and a rotor feeder drive 34. The rotor feeder drive 34 has an input 34a drivingly coupled to the drive shaft 13 and has an output 34b drivingly coupled to the rotor feeder 33.

Figure 2:
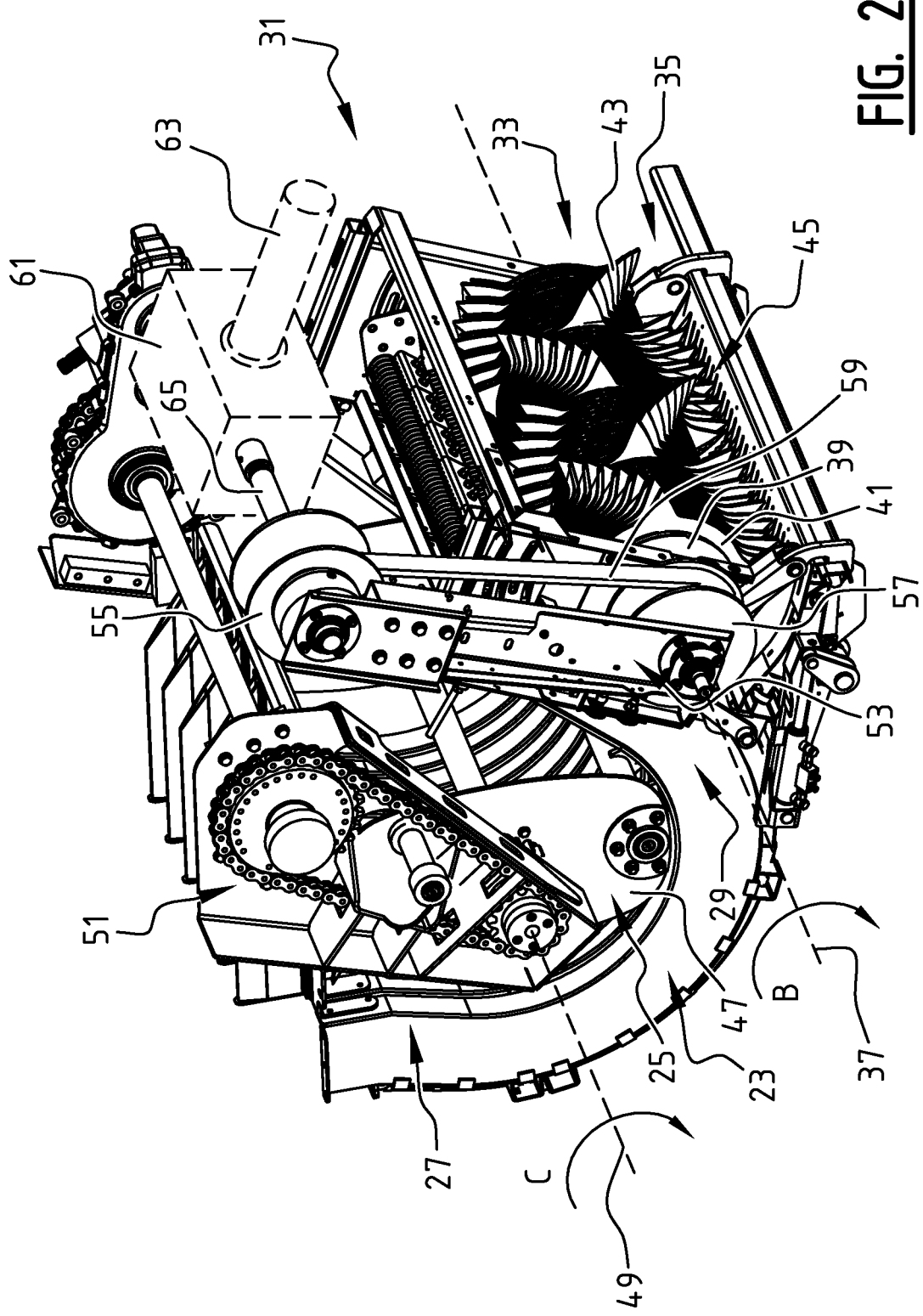
FIG. 2 shows a schematic perspective view of an embodiment of the rotor feeder unit according to the invention that is provided with a variable ration drive and that is arranged in the rectangular baler of FIG. 1.

In FIG. 2 the rotor feeder unit 31 is shown in more detail. The rotor feeder unit 31 is provided with a rotor feeder 33 carrying a set of tines 35. The rotor feeder 33 is rotatable about axis of rotation 37. The rotor feeder 33 has a cylindrical base body 39 carrying tine plates 41 each including a plurality of tines 43. The tine plates 41 being parallel to each other in planes perpendicular to the axis of rotation 37 and distributed in the direction of the axis of rotation 37 of the base body 39 with intermediate distances in between.

During operation rotor feeder 33 is rotated in the direction of arrow B about the axis of rotation 37, such that crop material that is fed to the rotor feeder unit 31 at the upstream side 45 thereof is cut in the rotor feeder unit 31 and conveyed into the bottom end 29 of the feeder duct 23 at the downstream side of the rotor feeder unit 31. In the feeder duct 23 feeder means 25 are operable that include drum 47 that is rotated in the direction of arrow C about an axis of rotation 49. As shown in FIG. 2 the feeder means 25 include a feeder means drive 51 of the fixed ratio chain drive-type for rotating the drum 47 about its axis of rotation 49. The rotor feeder unit 31 includes a variable ratio transmission 53 of the belt type. The variable ration transmission 53 comprises a variable-diameter input pulley 55 that corresponds in the shown embodiment to the input 34a of the drive 34 shown in FIG. 1. The variable ration transmission 53 further comprises a variable-diameter output pulley 57 that corresponds in the shown embodiment to the output 34b of the drive 34 shown in FIG. 1. A belt 59 is arranged between said input pulley 55 and said output pulley 57. The feeder means drive 51 of the fixed ratio chain drive-type and the variable ratio transmission 53 of the belt type of the rotor feeder unit 31 are both drivingly coupled to a gear box 61 having an input shaft 63. The variable-diameter input pulley 55 of the variable ratio transmission 53 of the rotor feeder unit 31 is drivingly coupled to an output shaft 65 of the gear box 61. The variable-diameter output pulley 57 of the variable ratio transmission 53 of the rotor feeder unit 31 is drivingly coupled to the rotor feeder 33. Input shaft 63 of the gearbox 61 is drivingly coupled to the drive shaft 13 shown in FIG. 1, such that the plunger 7, the feeder means 25 and the rotor feeder 25 are commonly driven by the motor of the tractor 5.

Figure 3:
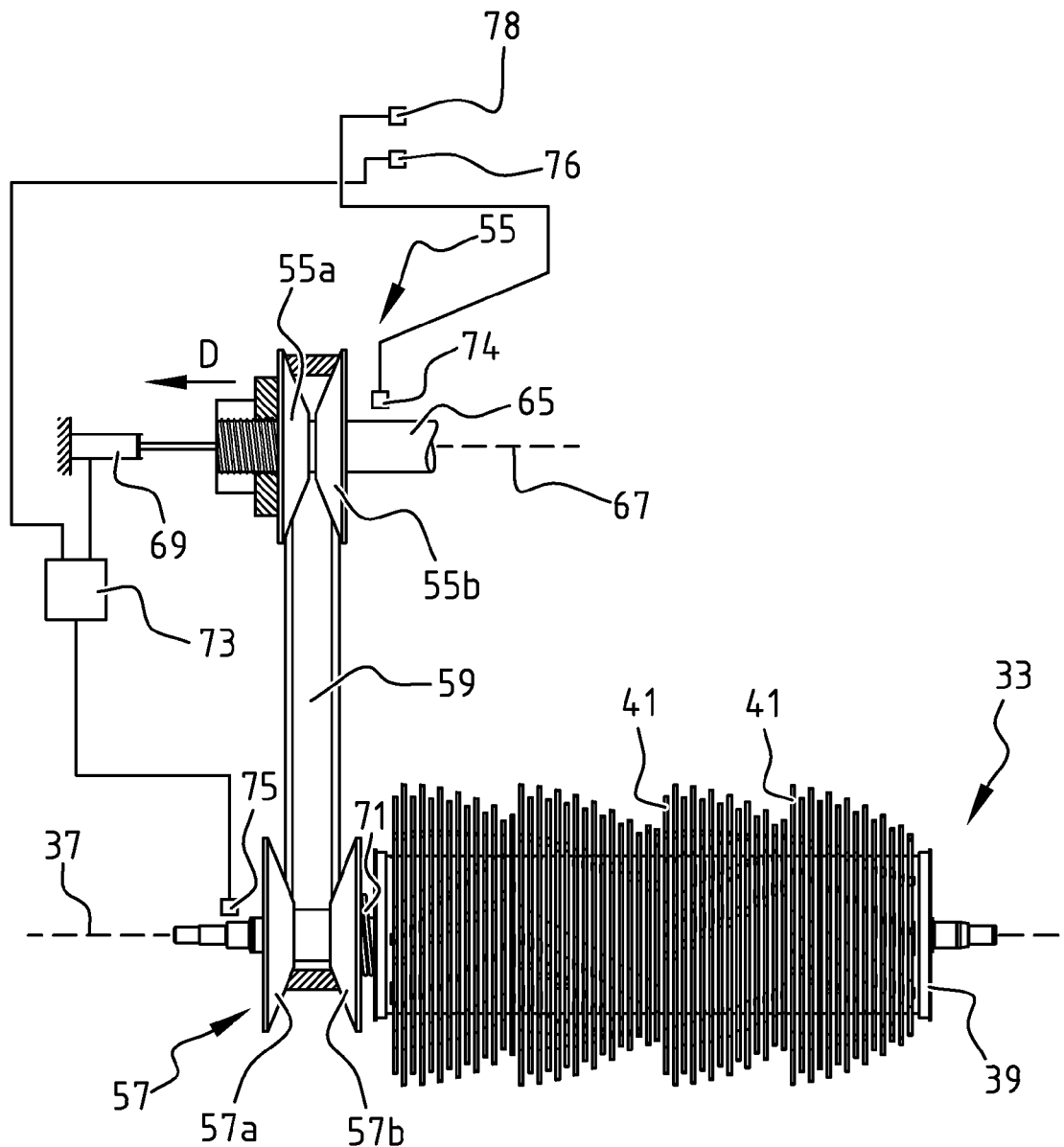
FIGS. 3 and 4 show schematically the working principle of the variable ratio transmission of the rotor feeder unit of FIG. 2.
Figure 4:
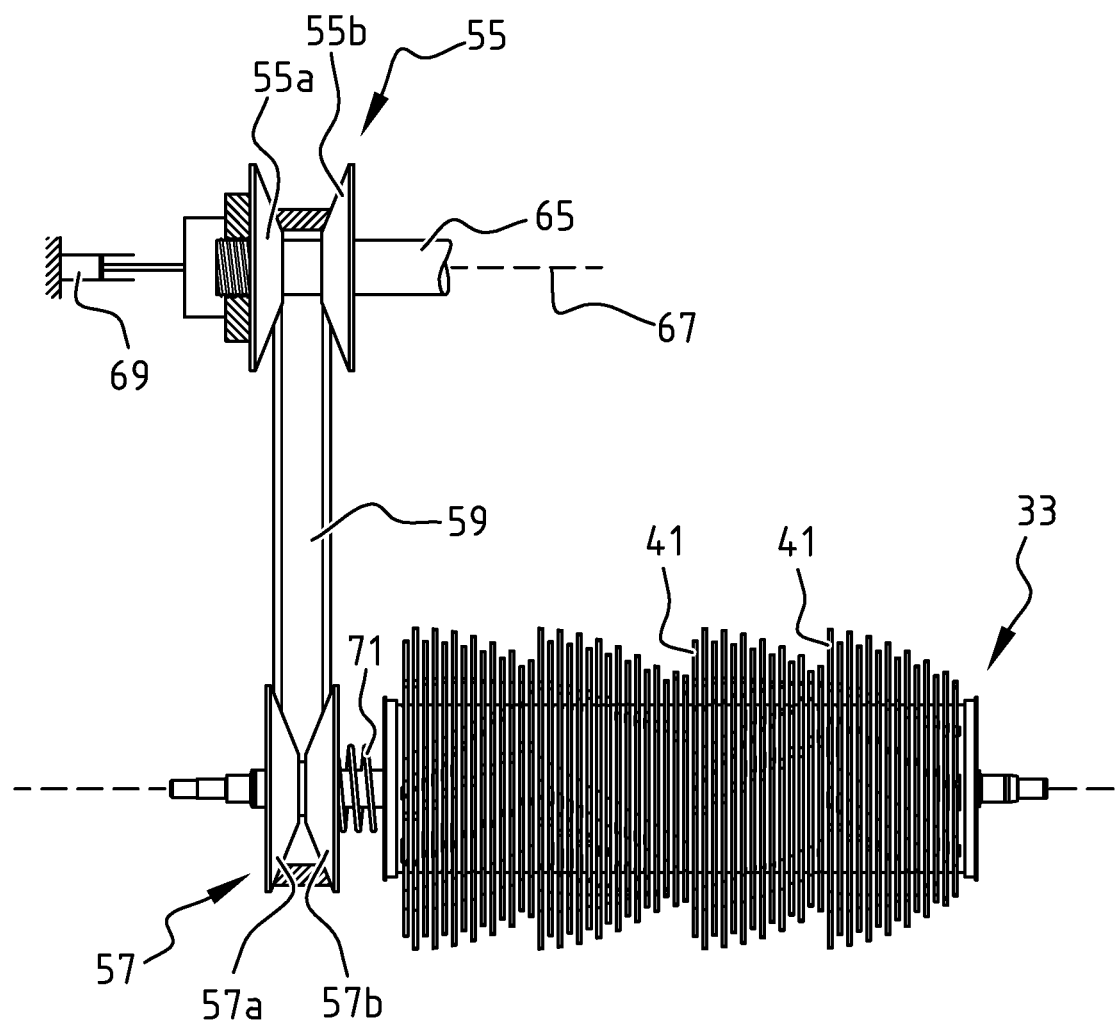

In FIGS. 3 and 4 the variable ratio transmission 53 of the belt-type, also known as a variable-diameter pulley (VDP) drive or Reeves drive, is shown. The variable-diameter input pulley 55 is split perpendicular to its axis of rotation 67 into two sheaves 55a, 55b. The distance between the two sheaves 55a, 55b can be selectively changed by moving one of the sheaves 55a relative to the other sheave 55b along the axis of rotation 67 by means of a schematically shown actuator 69. The V-belt 59 runs between the sheaves 55a, 55bThe variable-diameter output pulley 57 is split perpendicular to its axis of rotation 37 into two sheaves 57a, 57b. One of the sheaves 57b is movable relative to the other sheave 57a along the axis of rotation 37 and is forced in the direction of the other sheave 57a by means of a spring 71. Again the V-belt 59 runs between the sheaves 57a, 57bStarting from the situation shown in FIG. 3, the gear ratio of the variable ratio transmission 53 is changed by moving the two sheaves 55a, 55b of the input pulley 55 away from each other by moving the sheave 55a along the axis of rotation 67 in the direction of arrow D by means of actuator 69. Due to the V-shaped cross section of the belt 59, this causes the belt 59 to ride lower on the input pulley 55 and higher on the output pulley 57 where the spring 71 pushes the sheave 57b towards the other sheave 57a along the axis of rotation 37 in the direction of arrow E, thereby reducing the distance between the sheaves 57a, 57b of the output pulley 57. If the rotational speed of the output shaft 65 of the gear box 61 is maintained constant, the shown change in ratio of the variable ratio transmission 53 results in an decreased rotational speed of the rotor feeder 33. At the same time the torque delivered to the rotor feeder 33 is increased. As shown in FIGS. 3 and 4 an actuator 69 is connected to a controller 73. A sensor 75 is shown that is connected to the controller 73 and that is configured for measuring the rotational speed of the rotor feeder 33 and/or torque delivered to the rotor feeder 33. Furthermore, a sensor 74 is shown that is connected to the controller 73 and that is configured for measuring the rotational speed of the output shaft 65 of the gear box 61 and/or torque delivered to the variable-diameter input pulley 55. A sensor 76 is shown that is connected to the controller 73 and that is configured for measuring the rotational speed of the drive shaft 13 shown in FIG. 1 and/or the torque delivered by the motor of tractor 5. Still further, a sensor 78 is shown that is connected to the controller 73 and that is configured for measuring the rotational speed of the rotatable drum 47 of the feeder means 25 shown in FIG. 2 and/or the torque delivered to the rotatable drum 47.

Figure 5:
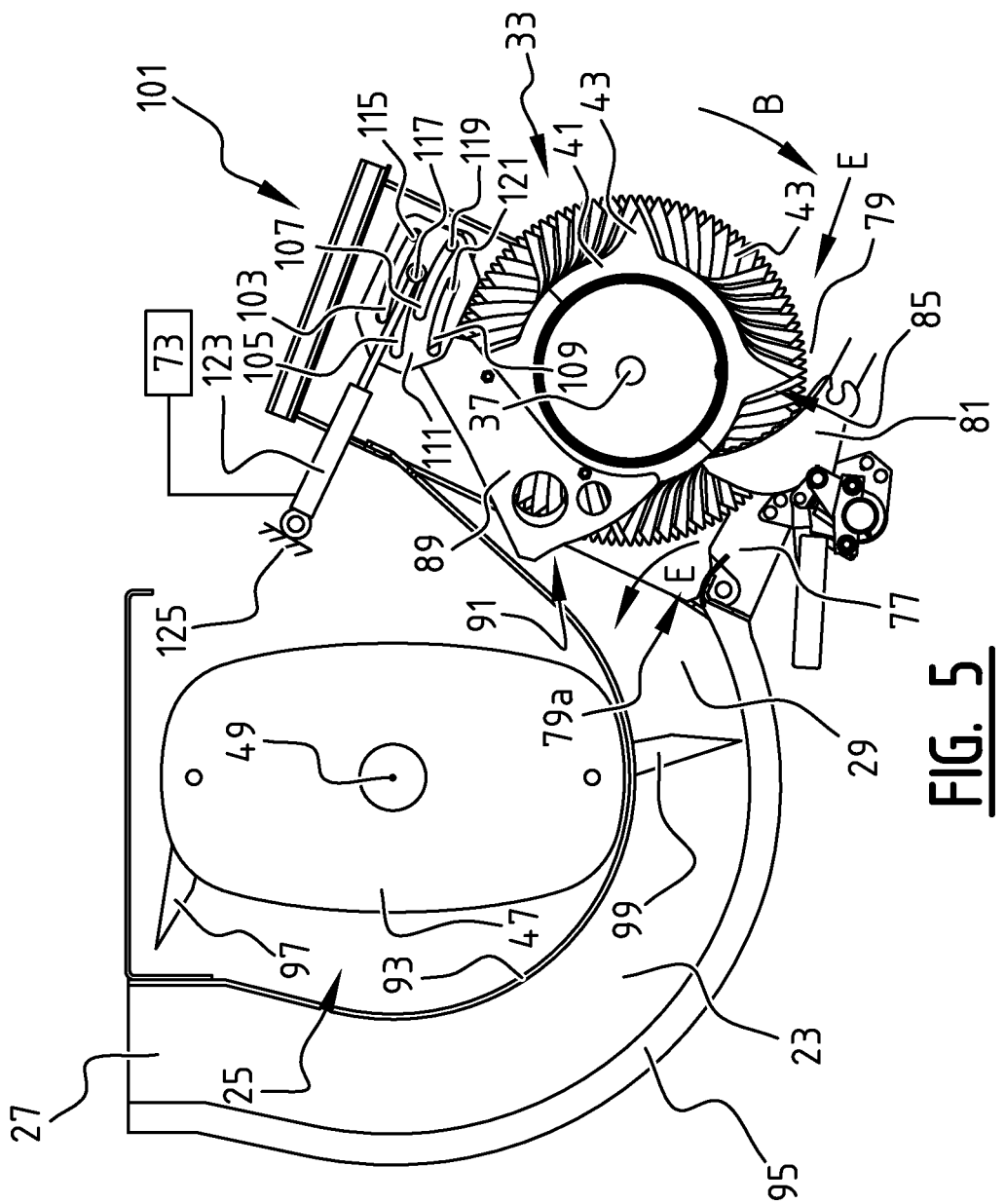
FIGS. 5 and 6 show a schematic side view of an embodiment of the rotor feeder unit according to the invention that is additionally provided with a scraper position adjusting arrangement.
Figure 6:
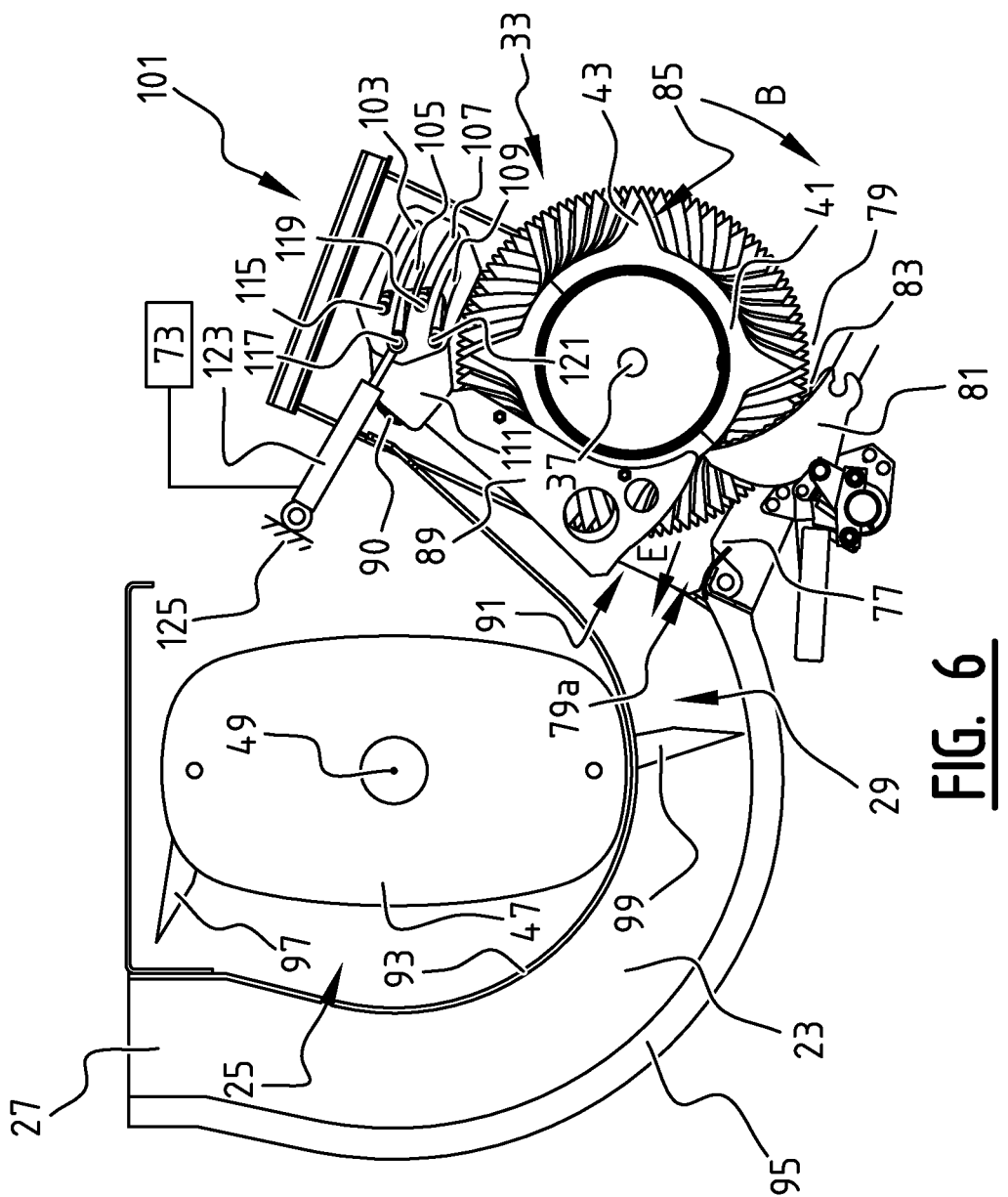

In FIGS. 5 and 6 is shown that the rotor feeder unit 31 has a rotor feeder unit bottom wall 77 distant from the rotor feeder 33 which forms a lower boundary of a conveying channel 79 through the rotor feeder unit 31. Cutting blades 81 protrude from the rotor feeder unit bottom wall 77 through the conveying channel 79 besides moving paths of the tines 43. The cutting blades 81 are parallel to each other in planes perpendicular to the axis of rotation 37 and distributed in the direction of the axis of rotation 37 with intermediate distances in between, such that each cutting blade 81 extends between two successive tine plates 41. Cutting edges 83 of the cutting blades 81 are oriented to counter the conveying direction E in the conveying channel 79 as defined by the direction B of rotation of the rotor feeder 33. The cutting edges 83 of the cutting blades 81 cooperate with the leading faces 85 of the tines 43 to cut crop material that is fed to the rotor feeder 33 at the inlet 87 of the conveying channel 79.

Scrapers 89 are placed in conveying direction E behind the rotor feeder 33. The scrapers 89 are mounted on a scraper bar 90 extending substantially parallel to the axis of rotation 37 of the rotor feeder 33. The scrapers 89 are parallel to each other in planes perpendicular to the axis of rotation 37 and distributed in the direction of the axis of rotation 37 with intermediate distances in between, such that each scraper 89 extends between two successive tine plates 41. Leading faces 91 of the scrapers 89 are oriented to counter the leading faces 85 of the tines 43 as the rotor feeder 33 is rotated in the direction of rotation B thereof. The leading faces 91 of the scrapers 89 and the leading faces 85 of the tines 43 cooperate to convey the cut crop material in conveying direction E toward the lower end 29 of feeder duct 23. In particular, the scrapers 89 remove the crop material from the tines 43 as the tines pass the scrapers 89.

In the feeder duct 23 defined between a feeder duct upper wall 93 and feeder duct bottom wall 95, feeder means 25 including a rotatable drum 47 having tines 97, 99 arranged thereon are operable to convey cut crop material that has been conveyed by the rotor feeder unit 31 into the lower end 29 of the feeder duct 23 from the lower end 29 of the feeder duct 23 toward the upper end 27.

At the end 79a of the conveying channel 79 the rotor feeder unit bottom wall 77 forms the lower boundary of the conveying channel 79 through the rotor feeder unit 31, while the leading faces 91 of the scrapers 89 form the upper boundary of the conveying channel 79. As shown in FIG. 5, the distance between the rotor feeder unit bottom wall 77 and the leading face 91 of the scrapers 89 in a plane perpendicular to the axis of rotation 37 of the rotor feeder 31 increases in conveying direction E. As a result the end 79a of the conveying channel 79 that is in communication with and that opens up in the lower end 29 of the feeder duct 23 has a reverse funnel shape in said plane perpendicular to the axis of rotation 37 of the rotor feeder 31.

The rotor feeder unit 31 is provided with a scraper position adjusting arrangement 101. The scraper position adjusting arrangement 101 includes the scraper bar 90 having the scrapers 89 arranged thereon. The scraper position adjusting arrangement 101 further includes a guide in the form of four slots 103, 105, 107, and 109 in opposing side walls 111 of the rotor feeder unit 31 between which side walls the scraper bar 90 extends. The scraper bar 90 is mounted at each end thereof on a mounting plate 113 that is parallel to the side walls 111. Each mounting plate 113 is provided with four guiding pins 115, 117, 119, 121 that each extend in one of the slots 103, 105, 107, and 109. The guiding pins 115, 117, 119, 121 and the slots 103, 105, 107, and 109, cooperate to define a path along which the scraper bar 90 is movable. For moving the scraper bar 90 along the path and arresting the scraper bar 90 at a desired location along said path, linear actuators 123 are provided at each end of the scraper bar 90. Each linear actuator 123 engages at one end thereof the mounting plate 113 and is at its other end mounted on a mounting point 125 stationary relative to the side walls 111 of the rotor feeder unit 31. The linear actuators 123 allow for moving the scraper bar 90 along the path by changing the length thereof and for arresting the scraper bar 90 at a desired location along said path by holding the linear actuators 123 in a specific position. The linear actuators 123 on either end of the scraper bar 90 are controlled in unison by means of the controller 73 of the rotor feeder unit 31 that is connected with the linear actuators 123.

The slots 103, 105, 107, and 109 have a circular curve that has the axis of rotation 37 of the rotor feeder 33 as its centre. By moving the scraper bar 90 along the path, the scrapers 89 are rotated about the axis 37 of rotation of the rotor feeder 33. The rotation of the scrapers 89 about the axis 37 of rotation of the rotor feeder 33 results in an adjustment of the angle of the leading face 91 of the scrapers 89 relative to the rotor feeder unit bottom wall 77. A movement of the scraper bar 90 along the path in the direction of arrow F results an angular displacement of the scrapers 89 about the axis of rotation 37 of the rotor feeder 31 in the direction of arrow F. As shown in FIG. 6, as a result thereof, the reverse funnel shape of the end 79a of the conveying channel 79 that is defined by the rotor feeder unit bottom wall 77 and the leading face 91 of the scrapers 89 is narrowed.

If, starting from the situation shown in FIG. 5, the rotational speed of the rotor feeder 33 is decreased by changing the transmission ratio of the variable ratio transmission 53, as described herein above under reference to FIGS. 3 and 4, the throughput of the rotor feeder 33, i.e. the volume of cut crop material that each second is conveyed by the rotor feeder 33, is decreased. This results in a decreased velocity of the cut crop material downstream of the rotor feeder 33. This decreased velocity of the cut crop material downstream of the rotor feeder 33 can be increased by narrowing the reverse funnel shape of the end 79a of the conveying channel 79 as described herein above under reference to FIGS. 5 and 6. Since controller 73 is connected to the actuator 69 of the variable ratio transmission 53 and to the actuator 123 of the scraper position adjusting arrangement 101, the controller 73 can cause the change of ratio of the variable ratio transmission and the angular displacement of the scrapers. In case the controller 73 is instructed to decrease the throughput of the rotor feeder 33 while maintaining the velocity of the crop material downstream of the rotor feeder 33 at a constant level, the controller 73 can cause a change of ratio of the variable ratio transmission and an angular displacement of the scrapers in order to decrease the throughput of the rotor feeder 33 while maintaining the velocity of the crop material downstream of the rotor feeder 33 at a constant level.

In the FIGS. 1 to 4 the drive 34 of the rotor feeder unit 31 is shown including a mechanical continuously variable ratio transmission of the belt type. As described in the summary of the invention, variable ratio transmission can alternatively also be another type of continuously variable ratio transmission. Furthermore, the drive 34 can additionally or alternatively include a stepped gear transmission. Still further, the drive 34 can additionally include a reversing mechanism for selectively reversing the direction of rotation of the rotor feeder 33.

In the FIG. 1 the rotor feeder unit 31 according to the invention is shown in a rectangular baler. Although the rotor unit 31 is in particularly advantageous in a rectangular baler, the rotor feeder unit 31 can alternatively be included in a round baler, in a loading wagon, or in an other agricultural machine.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A rotor feeder unit for an agricultural machine, the rotor feeder unit comprising:
    a rotor feeder carrying a set of tines for cutting crop material;
    a drive for driving the rotor feeder, the drive comprising:
        an input that is configured to be coupled to a power source;
        an output coupled to the rotor feeder for rotating the rotor feeder about its axis of rotation; and
        a mechanical continuously variable ratio transmission coupling the input and the output, wherein the mechanical continuously variable ratio transmission is of a belt type comprising:
            a variable-diameter input pulley;
            a variable-diameter output pulley;
            a belt arranged between the input pulley and the output pulley;
            an actuator for selective operation of the mechanical continuously variable ratio transmisson; and
            a controller connected to the actuator for controlling the actuator; and
        at least one sensor connected to the controller and configured for measuring at least one operational parameter of the rotor feeder, wherein the controller is configured for causing the actuator to selectively operate the variable ratio transmission based on the at least one operational parameter measured by the sensor.

2. The rotor feeder unit according to claim 1, wherein the drive further comprises a reversing mechanism for selectively reversing a direction of rotation of the rotor feeder.

3. The rotor feeder unit according to claim 1, wherein the mechanical continuously variable ratio transmission is variable by selective operation.

4. The rotor feeder unit according to claim 1, wherein the at least one operational parameter of the rotor feeder is at least one of an operational parameter indicative of a torque at the output of the drive, an operational parameter indicative of a torque at the input of the drive, an operational parameter indicative of a rotational speed of the rotor feeder, an operational parameter indicative of an operational speed at the input of the drive, and an operational parameter indicative of an operational speed at the output of the drive.

5. The rotor feeder unit according to claim 1, further comprising:
    a rotor feeder unit bottom wall distant from the rotor feeder forming a lower boundary of a conveying channel through the rotor feeder unit; and
    cutting blades that are configured to protrude from the rotor feeder unit bottom wall into the conveying channel besides moving paths of the tines,
    wherein the cutting blades are selectively movable between a cutting position in which the cutting blades protrude into the conveying channel and a retracted position in which the cutting blades do not protrude into the conveying channel.

6. The rotor feeder unit according to claim 1, further comprising:
    a rotor feeder unit bottom wall distant from the rotor feeder forming a lower boundary of a conveying channel through the rotor feeder unit; and
    scrapers placed in conveying direction behind the rotor feeder, the scrapers extending in between the tines of the rotor feeder and each having a leading face cooperating with the tines,
    wherein the rotor feeder unit comprises a scraper position adjusting arrangement adapted for angular displacement of the leading face of each of the scrapers relative to the rotor feeder unit bottom wall.

7. The rotor feeder unit according to claim 6, wherein the scraper position adjusting arrangement is adapted for rotating the scrapers about the axis of rotation of the rotor feeder for angularly displacing the leading face of each of the scrapers relative to the rotor feeder unit bottom wall.

8. The rotor feeder unit according to claim 6, wherein the scraper position adjusting arrangement comprises an actuator acting on the scrapers and configured for displacing the leading face of each of the scrapers relative to the rotor feeder unit bottom wall,
    wherein the controller is further connected to the actuator of the scraper position adjusting arrangement for controlling of the actuator of the scraper position adjusting arrangement in addition to controlling of the actuator of the variable ratio transmission.

9. The rotor feeder unit according to claim 8,
    wherein the controller is further configured for causing the actuator of the scraper position adjusting arrangement to displace the leading face of the scrapers relative to the rotor feeder unit bottom wall based on the at least one operational parameter measured by the sensor.

10. An agricultural machine, comprising:
    a rotor feeder unit configured for conveying crop material, the rotor feeder unit comprising: a rotor feeder carrying a set of tines for cutting crop material; a drive for driving the rotor feeder, the drive comprising: an input that is configured to be coupled to a power source; an output coupled to the rotor feeder for rotating the rotor feeder about its axis of rotation; and a mechanical continuously variable ratio transmission coupling the input and the output, wherein the mechanical continuously variable ratio transmission is of a belt type comprising: a variable-diameter input pulley; a variable-diameter output pulley; a belt arranged between the input pulley and the output pulley; an actuator for selective operation of the mechanical continuously variable ratio transmission; and a controller connected to the actuator for controlling the actuator; and at least one sensor connected to the controller and configured for measuring at least one operational parameter of the rotor feeder, wherein the controller is configured for causing the actuator to selectively operate the variable ratio transmission based on the at least one operational parameter measured by the sensor;
    at least one additional operation implement; and
    a main drive for driving the rotor feeder unit and the at least one additional operational implement, wherein the main drive comprises an output for driving the rotor feeder unit and the input of the drive of the rotor feeder unit is coupled to the output of the main drive.

11. The agricultural machine according to claim 10, further comprising at least one additional sensor connected to the controller and configured for measuring at least one operational parameter of the main drive that is indicative of a load on the main drive or for measuring at least one operational parameter of the at least one additional operational implement that is indicative of a load on the at least one additional operational implement.

12. An agricultural baler, comprising:
a bale chamber having an inlet opening formed therein;
a feeder duct communicating with the bale chamber through the inlet opening for charges of crop material to be transferred from the feeder duct into the bale chamber;
a plunger reciprocally movable within the bale chamber to compress successive charges of crop material received from the feeder duct to form a bale;
a feeder operable within the feeder duct to accumulate a charge of crop material therein and then stuff that accumulated charge into the bale chamber;
a rotor feeder unit configured for conveying crop material to the feeder duct, the rotor feeder unit comprising: a rotor feeder carrying a set of tines for cutting crop material; a drive for driving the rotor feeder, the drive comprising: an input that is configured to be coupled to a power source; an output coupled to the rotor feeder for rotating the rotor feeder about its axis of rotation; and a mechanical continuously variable ratio transmission coupling the input and the output, wherein the mechanical continuously variable ratio transmission is of a belt type comprising: a variable-diameter input pulley; a variable-diameter output pulley; a belt arranged between the input pulley and the output pulley; an actuator for selective operation of the mechanical continuously variable ratio transmisson; and a controller connected to the actuator for controlling the actuator; and at least one sensor connected to the controller and configured for measuring at least one operational parameter of the rotor feeder, wherein the controller is configured for causing the actuator to selectively operate the variable ratio transmission based on the at least one operation parameter measured by the sensor; and
a main drive for driving the plunger, the feeder, and the rotor feeder unit, wherein the main drive is provided with an output for driving the rotor feeder unit and the input of the drive of the rotor feeder unit is coupled to the output of the main drive.

* * * * *